US010030610B2

United States Patent
Foege

(10) Patent No.: US 10,030,610 B2
(45) Date of Patent: Jul. 24, 2018

(54) FUEL SYSTEM FOR AN ENGINE

(71) Applicant: Electro-Motive Diesel, Inc., LaGrange, IL (US)

(72) Inventor: Aaron Gamache Foege, Westmont, IL (US)

(73) Assignee: Progress Rail Locomotive Inc., LaGrange, IL (US)

(*) Notice: Subject to any disclaimer, the term of this patent is extended or adjusted under 35 U.S.C. 154(b) by 571 days.

(21) Appl. No.: 14/664,374

(22) Filed: Mar. 20, 2015

(65) Prior Publication Data

US 2016/0273491 A1 Sep. 22, 2016

(51) Int. Cl.
| | |
|---|---|
| F02M 21/02 | (2006.01) |
| F02M 21/06 | (2006.01) |
| F02M 25/08 | (2006.01) |
| F02M 31/20 | (2006.01) |
| B61C 5/00 | (2006.01) |
| F02D 19/06 | (2006.01) |

(52) U.S. Cl.
CPC .......... F02M 21/0224 (2013.01); B61C 5/00 (2013.01); F02D 19/0647 (2013.01); F02M 21/0218 (2013.01); F02M 21/0287 (2013.01); F02M 21/06 (2013.01); F02M 25/08 (2013.01); F02M 31/20 (2013.01); *Y02T 10/126* (2013.01); *Y02T 10/32* (2013.01); *Y02T 10/36* (2013.01)

(58) Field of Classification Search
CPC .......... F02M 21/0224; F02M 21/0218; F02M 21/0287; F02M 21/06; F02M 25/08; F02M 31/20; B61C 5/00; F02D 19/0647
See application file for complete search history.

(56) References Cited

U.S. PATENT DOCUMENTS

| | | | | | |
|---|---|---|---|---|---|
| 3,857,245 | A | * | 12/1974 | Jones | F25J 1/0025 60/651 |
| 4,924,822 | A | * | 5/1990 | Asai | F02M 21/00 123/27 GE |
| 5,375,580 | A | * | 12/1994 | Stolz | F02B 29/0443 123/527 |
| 5,887,567 | A | * | 3/1999 | White | B61C 5/00 123/294 |
| 7,690,365 | B2 | * | 4/2010 | Lee | B63B 25/14 123/27 GE |
| 7,841,322 | B2 | * | 11/2010 | Bach | F02B 29/0418 123/480 |
| 7,996,147 | B2 | * | 8/2011 | Gokhale | F02D 35/023 60/602 |
| 8,522,691 | B1 | * | 9/2013 | Foege | F01P 11/14 105/26.05 |
| 2006/0213488 | A1 | * | 9/2006 | Post | F02M 55/005 123/527 |
| 2010/0175579 | A1 | * | 7/2010 | Read | B60T 1/10 105/1.4 |

(Continued)

*Primary Examiner* — Jason C Smith
(74) *Attorney, Agent, or Firm* — Finnegan, Henderson, Farabow, Garrett & Dunner, LLP

(57) ABSTRACT

A fuel system is disclosed for use with an engine. The fuel system may have a tank holding a supply of liquefied fuel and a supply of gaseous fuel boiled off from the liquefied fuel. The fuel system may also have at least one compressor fluidly coupled to the tank for compressing the supply of gaseous fuel and an accumulator fluidly coupled downstream of the at least one compressor for storing the compressed supply of gaseous fuel.

11 Claims, 2 Drawing Sheets

(56) References Cited

U.S. PATENT DOCUMENTS

| | | | |
|---|---|---|---|
| 2013/0213256 A1* | 8/2013 | McAlister | B01J 12/007 |
| | | | 105/62.1 |
| 2014/0216403 A1* | 8/2014 | Stockner | F02M 69/08 |
| | | | 123/445 |
| 2014/0290279 A1* | 10/2014 | Lee | B63B 25/16 |
| | | | 62/48.2 |
| 2015/0075488 A1* | 3/2015 | Touchette | F02D 19/0605 |
| | | | 123/299 |
| 2015/0128597 A1* | 5/2015 | Schlak | F03B 13/00 |
| | | | 60/719 |
| 2015/0345430 A1* | 12/2015 | Foege | F02M 21/0215 |
| | | | 105/61.5 |
| 2016/0017845 A1* | 1/2016 | Huang | F02M 21/0209 |
| | | | 290/1 A |
| 2016/0102617 A1* | 4/2016 | Coldren | F02D 41/3017 |
| | | | 105/62.1 |
| 2016/0273491 A1* | 9/2016 | Foege | F02M 21/0224 |

\* cited by examiner

FUEL SYSTEM FOR AN ENGINE

TECHNICAL FIELD

The present disclosure relates generally to a fuel system and, more particularly, to a fuel system for an engine.

BACKGROUND

Gaseous fuel powered engines are common in locomotive applications. For example, the engines of a locomotive can be powered by natural gas alone or by a mixture of natural gas and diesel fuel. Due to environmental and economic drivers, a primary source of fuel for engines of locomotives is becoming liquid natural gas (LNG). LNG has a lower volumetric energy density than diesel fuel, thus leading to the storage of the LNG in a separate fuel tender. In order to maintain the LNG in a liquid state at atmospheric pressures, the LNG must be stored in a cryogenic, insulated tank capable of maintaining the temperature of the LNG below −165 degrees Centigrade. While a majority of the LNG remains liquid without refrigeration for a period of time that may be as long as several weeks, a portion of the LNG within the tank may boil off into methane gas as heat is absorbed from the environment. This methane gas accumulates as a vapor above the LNG in the storage tank. The accumulated gas cannot be used as part of the LNG fuel source and is typically vented to the surrounding environment, thus reducing the efficiency of the system.

One attempt to improve the efficiency of a fuel powered engine is disclosed in U.S. Pat. No. 4,924,822 (the '822 patent) issued to Asai et al. on May 15, 1990. The '822 patent describes a gas feed system for a diesel engine. A boil-off gas evaporated from a liquefied gas is fed to the diesel engine either alone or in combination with the liquefied gas. The boil-off gas is pressurized in one or more streams before being fed to the diesel engine through one or more gas feed pipes.

Although the system of the '822 patent may enable the boil-off gas to be partially recovered for use in the diesel engine, the system may not enable full recovery and use of the boil-off gas. For example, when the diesel engine is idling, operating on low power, or not operational, the boil-off gas may need to be vented to the surrounding environment since the engine may not be configured to receive a low pressure flow of gas.

The presently disclosed fuel system is directed to addressing one or more of the problems set forth above.

SUMMARY

In one aspect, the present disclosure is directed to a fuel system for an engine. The fuel system includes a tank holding a supply of liquefied fuel and a supply of gaseous fuel boiled off from the liquefied fuel. The fuel system also includes at least one compressor configured to compress the supply of gaseous fuel and a first accumulator fluidly coupled downstream of the at least one compressor and configured to store the compressed supply of gaseous fuel.

In another aspect, the present disclosure is directed to a method of delivering fuel to a consumer. The method includes directing a supply of gaseous fuel boiled off from a supply of liquefied fuel to a compressor, compressing the supply of gaseous fuel with the compressor, and directing the compressed supply of gaseous fuel to a first accumulator.

In yet another aspect, the present disclosure is directed to a train consist. The train consist includes a locomotive having an engine configured to combust a fuel supply and a tender car coupled to the locomotive and having a tank configured to hold a supply of liquefied fuel and a supply of gaseous fuel boiled off from the liquefied fuel. The train consist also includes a fuel system configured to provide the engine of the locomotive with the fuel supply. The fuel system includes a tank holding a supply of liquefied fuel and a supply of gaseous fuel boiled off from the liquefied fuel and a compressor fluidly coupled to the tank and configured to compress the supply of gaseous fuel. The fuel system also includes an intercooler fluidly coupled to the compressor and configured to cool the compressed supply of gaseous fuel and a first accumulator fluidly coupled downstream of the intercooler and configured to store the cooled, compressed supply of gaseous fuel. The fuel system further includes a pump fluidly coupled to the tank and configured to draw the liquefied fuel from the tank, a vaporizer fluidly coupled to the pump and configured to vaporize the liquefied fuel drawn from the tank, and a second accumulator located downstream of the vaporizer and configured to store the vaporized supply of the liquefied fuel. A valve is in fluid communication with the first accumulator, the second accumulator, and the tank. The valve is configured to selectively direct the cooled, compressed supply of gaseous fuel, the vaporized supply of the liquefied fuel, or a mixture thereof to the engine as the fuel supply.

DETAILED DESCRIPTION

Figure 1:
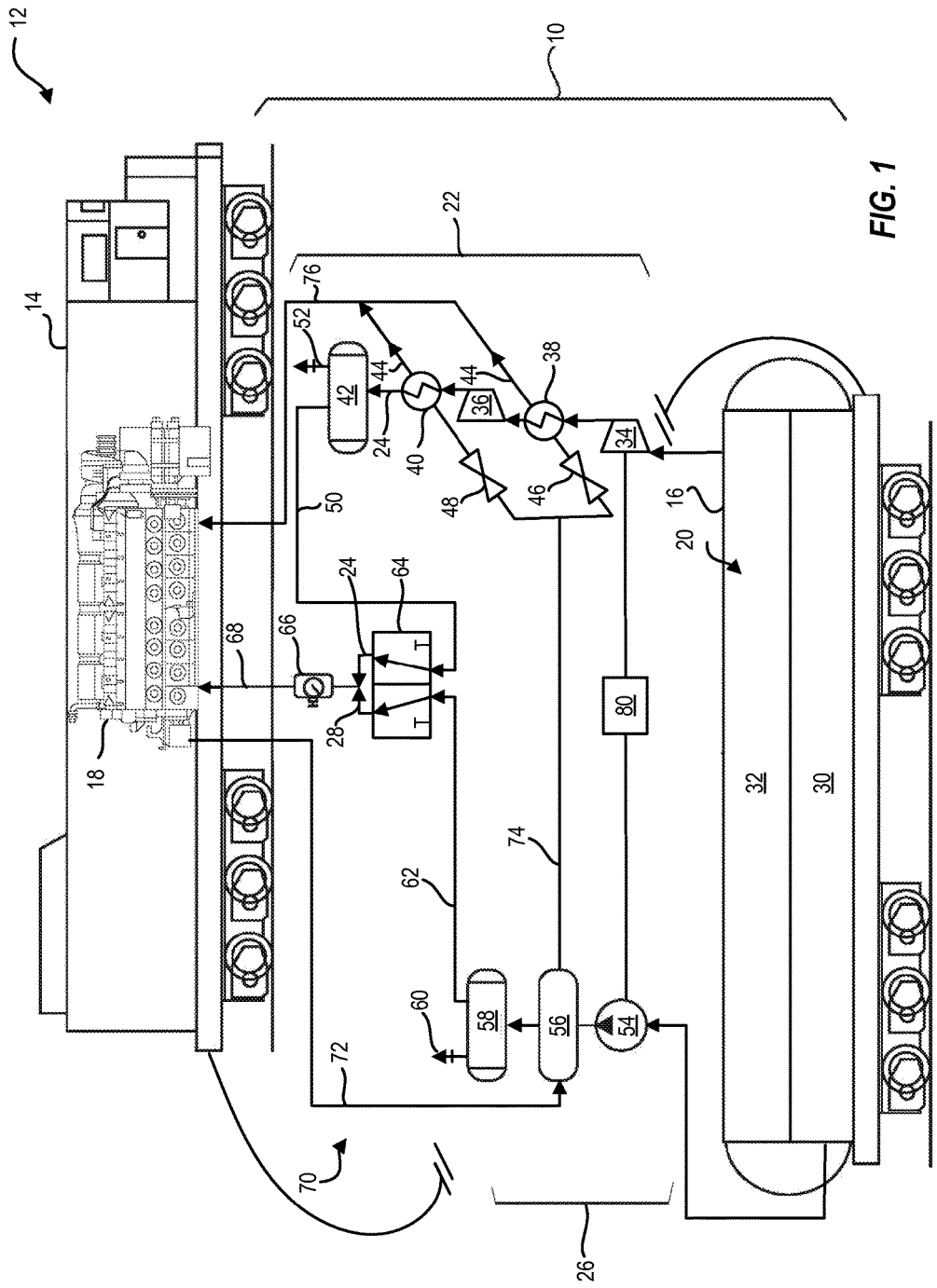
FIG. 1 is a diagrammatic illustration of an exemplary disclosed fuel system.

FIG. 1 illustrates an exemplary fuel system 10. In the embodiment shown in FIG. 1, fuel system 10 is associated with a mobile application, specifically a train consist 12. Train consist 12 may have one or more locomotives 14 and a tender car 16. Locomotive 14 may be coupled to tow tender car 16, and tender car 16 may be configured to provide one or more engines 18 of locomotive 14 with fuel via fuel system 10. It should be noted, however, that fuel system 10 could be associated with other mobile or stationary applications, as desired.

Fuel system 10 may include multiple components and/or subsystems that cooperate to provide a gasified fuel (e.g., natural gas) to engine(s) 18 in a regulated manner. In the illustrated embodiment, the fuel system 10 includes a tank 20 of fuel, a first fuel subsystem 22 configured to produce a first fuel source 24, and a second fuel subsystem 26 configured to produce a second fuel source 28.

Tank 20 may be a cryogenic tank configured to hold a fuel, such as liquefied natural gas (LNG). The fuel in the tank 20 may be separated into a liquefied fuel 30 (e.g., LNG) and a gaseous fuel 32 (e.g., methane). For example, in one embodiment, a portion of the liquefied fuel 30 may remain in a liquid state, and a portion may boil off to produce the gaseous fuel 32 in proportion to the heat absorbed from the surrounding environment. As such, the gaseous fuel 32 may accumulate in the vapor space above the liquefied fuel 30 within the tank 20.

In one embodiment, the tank 20 is an insulated tank that maintains a temperature of the natural gas contained therein below a boiling temperature of about −165° C. It is contemplated that tank 20 may be provided with conventional equipment for handling LNG, for example chillers, circulators, heaters, ventilators, etc., as desired.

The first fuel subsystem 22 is configured to produce the first fuel source 24 from the gaseous fuel 32 in the tank 20. To that end, the first fuel system 22 includes one or more compressors 34, 36, an intercooler 38, an after cooler 40, and an accumulator 42. The compressors 34, 36, the intercooler 38, and the after cooler 40 are configured to cooperate to produce the first fuel source 24 at a temperature and/or pressure that matches a desired fuel supply temperature and/or pressure for the engine(s) 18. For example, the compressors 34, 36 may compress the gaseous fuel 32 to a fuel supply pressure of a high pressure direct injection (HPDI) engine (e.g., about 400 bar), and the intercooler 38 and/or after cooler 40 may cool the compressed gaseous fuel 32 to a suitable temperature for such an engine.

In the illustrated embodiment, there are two compressors 34, 36 depicted. Each compressor 34, 36 may be any type of compressor known in the art for handling boil-off gas of LNG. However, the quantity of compressors shown in FIG. 1 is merely an example not meant to limit presently contemplated embodiments. Indeed, in other embodiments, any quantity of compressors or compression stages may be utilized to compress the gaseous fuel 32.

The intercooler 38 is located along the flow path of the gaseous fuel 32 through the first fuel subsystem 22 after the compressor 34 and before the compressor 36. As such, the intercooler 38 may be configured to transfer heat from the gaseous fuel 32 to a coolant 44 when a valve 46 is positioned in an open position to enable the coolant 44 to flow through the intercooler 38. By transferring the heat from the gaseous fuel 32 to the coolant 44, the temperature of the gaseous fuel 32 may be reduced before the gaseous fuel 32 is compressed in the compressor 36.

The after cooler 40 is located along the flow path of the gaseous fuel 32 after the compressor 36 and before the accumulator 42. As such, the after cooler 40 may be configured to transfer heat from the gaseous fuel 32 to the coolant 44 when a valve 48 is positioned in an open position to enable the coolant 44 to flow through the after cooler 40. By transferring the heat from the gaseous fuel 32 to the coolant 44, the temperature of the gaseous fuel 32 may be reduced to produce the first fuel source 24, which is transferred to the accumulator 42.

It should be noted that although the embodiment shown in FIG. 1 includes the intercooler 38 and the after cooler 40, in other embodiments, one or both of these components may be omitted, depending on implementation-specific considerations. Further, one or both of these components may be selectively placed in or removed from the flow path of the gaseous fuel 32 through the first fuel subsystem 22 by controlling valves 46 and 48, depending on the given application and/or the availability of the coolant 44.

The accumulator 42 may embody a high-pressure vessel configured to store pressurized natural gas for future use by the engine(s) 18. As a pressure of the first fuel source 24 from the compressor 36 and/or the after cooler 40 exceeds a pressure of the accumulator 42, the first fuel source 24 may flow into the accumulator 42. Because the natural gas therein is compressible, it may act like a spring and compress as more natural gas flows in. When the pressure of the first fuel source 24 in a supply line 50 drops below the pressure of the accumulator 42, the first fuel source 24 may expand and exit the accumulator 42.

The accumulator 42 may alternatively embody a membrane/spring-biased or bladder type of accumulator, if desired. Further, the accumulator 42 may include a vent 52 configured to selectively allow the first fuel source 24 stored in the accumulator 42 to discharge from the accumulator 42 to the atmosphere in a controlled manner (i.e., at a control pressure and temperature) that does not compromise the integrity of the vent 52.

The second fuel subsystem 26 is configured to produce the second fuel source 28 from the liquefied fuel 30 in the tank 20. To that end, the second fuel subsystem 26 includes a pump 54 configured to draw the liquefied fuel 30 from the tank 20, a vaporizer 56 configured to vaporize the liquefied fuel 30, a high-pressure accumulator 58 configured to hold a supply of the second fuel source 28, and one or more pressure reducing devices fluidly connected to the accumulator 58. In the disclosed embodiment, one pressure reducing device is shown embodying a vent 60. The vent 60 may be located to selectively vent the accumulator 58 to the atmosphere.

The pump 54 may be any type of pump known in the art for handling natural gas in its liquid state (LNG) and/or gaseous state. In particular, at any point between the tank 20 and the accumulator 58 (e.g., upstream and/or downstream of the pump 54), the LNG may gasify. In one disclosed embodiment, the LNG is gasified downstream of the pump 54, and the pump 54 is configured to handle only LNG. In this embodiment, the pump 54 includes a fixed displacement pumping device (e.g., a piston, diaphragm or rotor pump) that is powered by a variable speed drive. With this configuration, although the displacement of the pump 54 may be fixed, the output of the pump 54 may still be varied by adjusting the speed of the drive. Other types of pumps may alternatively be utilized to push natural gas through supply line 62, if desired, for example, a variable displacement pump.

The accumulator 58 may embody a high-pressure vessel configured to store pressurized natural gas for future use by the engine(s) 18. As a pressure of the natural gas from the pump 54 exceeds a pressure of the accumulator 58, the natural gas may flow into the accumulator 58, thus accumulating the second fuel source 28 therein. Because the natural gas therein is compressible, it may act like a spring and compress as more natural gas flows in. When the pressure of the natural gas in supply line 62 drops below the pressure of the accumulator 58, the second fuel source 28 may expand and exit the accumulator 58.

The accumulator 58 may alternatively embody a membrane/spring-biased or bladder type of accumulator, if desired. Further, the accumulator 58 may include the vent 60. The vent 60 may be configured to selectively allow the second fuel source 28 to discharge from the accumulator 58 to the atmosphere in a controlled manner (i.e., at a control pressure and temperature) that does not compromise the integrity of the vent 60.

The second fuel source 28 produced from the liquefied fuel 30 by the second fuel subsystem 26 and the first fuel source 24 produced from the gaseous fuel 32 by the first fuel subsystem 22 are directed via supply lines 62 and 50, respectively, to a valve 64 configured to direct one or both of the first fuel source 24 and the second fuel source 28 to the engine(s) 18. For example, the valve 64 may direct the second fuel source 28 to the engine(s) 18 to meet a high power fueling demand and the first fuel source 24 to the engine(s) 18 to meet an idle or low power fueling demand.

To that end, the valve 64 may be any suitable valve known in the art for selecting one or both of the first fuel source 24 and the second fuel source 28. For example, the illustrated embodiment depicts the valve 64 as a two position, three way valve having both the first fuel source 24 and the second fuel source 28 flowing therethrough. However, in other embodiments, the valve 64 may be a directional or mixing valve, depending on implementation-specific considerations. In some embodiments, the valve 64 may be a mixing valve configured to selectively supply the first fuel source 24, the second fuel source 28, or a mixture of the first fuel source 24 and the second fuel source 28 to the engine(s) 18.

In some embodiments, the valve 64 may direct the first fuel source 24, the second fuel source 28, or the mixture thereof to a consumer. The consumer may be any downstream user of the fuel source(s) directed thereto. For example, the consumer may consume the fuel source(s) in engine(s) 18, use the fuel source(s) to fuel another operation, distribute the fuel source(s) to a downstream consumer, or consume or use the fuel source(s) in another suitable manner.

Further, in some embodiments, the valve 64 may be a passive valve, such as a check valve, configured to allow a fluid, such as the first fuel source 24, the second fuel source 28, or a mixture thereof, to flow through the valve 64 in a single direction. In such embodiments, the first fuel source 24, the second fuel source 28, or a mixture thereof may flow through the valve 64 without the valve 64 being under the control of a controller.

Additionally, in some embodiments, the accumulators 42 and 58 may be subject to a variety of implementation-specific variations. For example, in one embodiment, only a single accumulator may be provided. In this embodiment, the output of the vaporizer 56 and the compressor 36 (or after cooler 40) may be received in the single accumulator. Further, in other embodiments, the position of the accumulators 42 and 58 (or the single accumulator in a combined embodiment) relative to the position of the valve 64 may be varied. For example, in one embodiment, a single accumulator may be located downstream of the valve 64.

A regulator 66 may be disposed downstream of the valve 64 to enable discharge from the accumulators 42 and 58 through the valve 64 in a controlled manner. The regulator 66 may direct the discharging fuel to the engine(s) 18 at a desired fuel flow rate via supply line 68. For example, in one embodiment, the valve 64 may select the first fuel source 24, and the fuel flow rate may be matched to an idle or low power setting (e.g., for dynamic braking) of the engine(s) 18 (e.g., at about 1-20 kg/hr). In another embodiment, the valve 64 may select the second fuel source 28, and the fuel flow rate may be matched to an operational or high power setting of the engine(s) 18 (e.g., at about 20-700 kg/hr for general operation, or at about 600-700 kg/hr for a more efficient operation).

The first fuel subsystem 22 and/or the second fuel subsystem 26 may be configured to utilize one or more byproducts of the operation of the engine(s) 18. For example, a coolant loop 70 may utilize heated coolant (e.g., glycol, water, glycol/water mixture, etc.) 44 discharged from the engine(s) 18. Specifically, in one embodiment, the heated coolant 44 from the engine(s) 18 is directed through supply line 72 to the vaporizer 56 to vaporize the liquefied fuel 30 by transferring heat to the liquefied fuel 30. The cooled coolant 44 is then directed via supply line 74 and valves 46 and 48 to one or both of intercooler 38 and after cooler 40 to cool the gaseous fuel 32 either between compression stages or after compression is complete. The coolant 44 is then recycled back to the engine(s) 18 via supply line 76.

Additionally, the first fuel subsystem 22 and/or the second fuel subsystem 26 may receive power from a power source 80. In some embodiments, the power source 80 may derive power from a source in the locomotive 14, such as engine(s) 18. In such embodiments, the power directed through a coupling to power the pump 54 (e.g., at about 40-50 KW) may be used to power the compressors 34, 36 (e.g., at about 6-10 KW). In other embodiments, the power source 80 may provide power to the compressors 34, 36 derived from electricity generated during dynamic braking of the locomotive 14. Still further, in implementations in which the locomotive 14 is unavailable as a source of power, the compressors 34, 36 may be run off of shore power to draw down the pressure head in the tender car 16 to assist with refueling operations or extend the period of time from loading of the fuel to the first instance of pressure relief. Additionally, although a single power source 80 is shown as providing power to both the pump 54 and the compressors 34, 36, in other embodiments, any quantity of power sources may be provided and dedicated to any desired number of the components.

INDUSTRIAL APPLICABILITY

The disclosed fuel systems find potential application in any gas handling situation. The disclosed fuel systems may find particular application in mobile gaseous fuel handling systems, such as are found in train consist 12. The disclosed fuel systems may enable both the liquefied fuel 30 and the gaseous fuel 32 boiled off from the liquefied fuel 30 to be utilized as a source of fuel for the engine(s) 18, thus increasing efficiency of the fuel system 10 and reducing or eliminating the need to vent the gaseous fuel 32 to the surrounding environment. Operation of the fuel system 10 will now be described.

Figure 2:
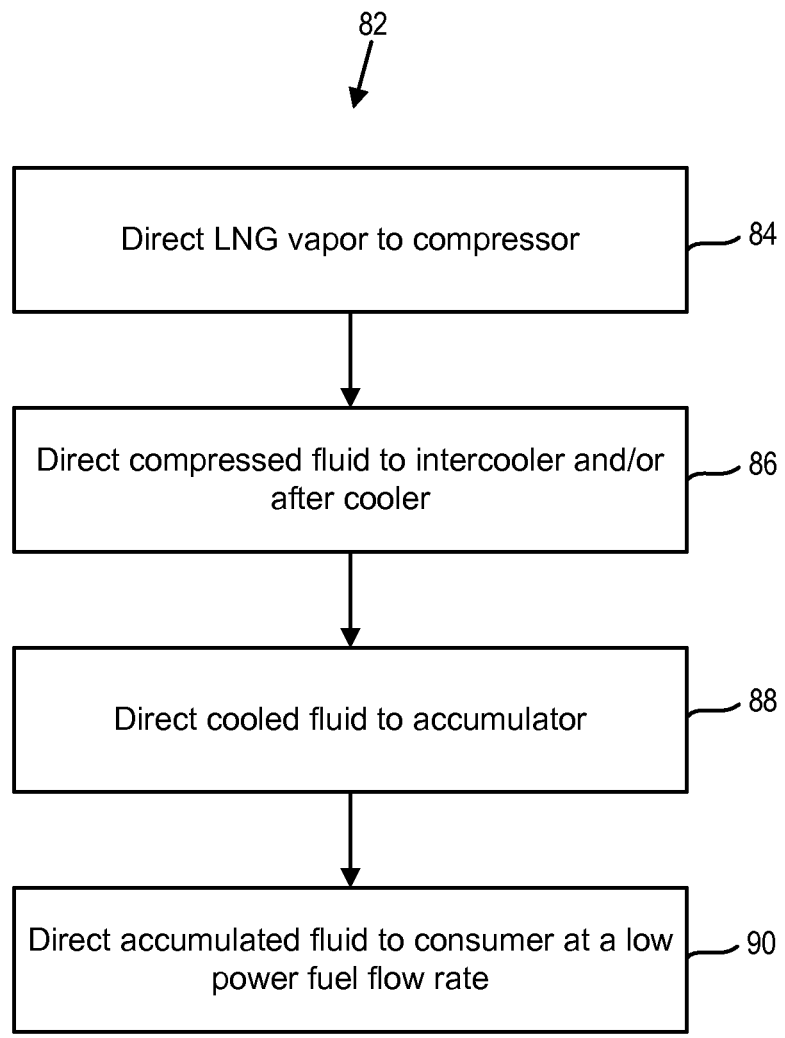
FIG. 2 is a flow chart illustrating an exemplary disclosed method for delivering fuel to a consumer with the fuel system of FIG. 1.

Referring to FIG. 2, a method 82 illustrates one operational embodiment of the first fuel subsystem 22 of the fuel system 10. Such operation may begin with the drawing of the gaseous fuel 32 from the tank 20 and directing of the gaseous fuel 32 to the compressors 34, 36 (step 84). The gaseous fuel 32 may be further directed through one or both of the intercooler 38 and the after cooler 40 to cool the gaseous fuel 32, either in between compression stages or after the final compression stage, to produce the first fuel source 24 (step 86). The first fuel source 24 may then be directed into the accumulator 42 (step 88) for storage. When desired for the given application, the accumulated first fuel source 24 may be directed to a consumer, for example, at a low power fuel flow rate via supply line 50, to meet a fueling demand at the engine(s) (step 90).

Operation of the second fuel subsystem 26 of the fuel system 10 may begin with the drawing of the liquefied fuel 30 from the tank 20 by the pump 54. The liquefied fuel 30 drawn by the pump 54 may be vaporized by the vaporizer 56 to produce the second fuel source 28. The second fuel source 28 is directed at high-pressure into the accumulator 58 for storage. When desired for the given application, the accumulated second fuel source 28 may be directed to a consumer, for example, via supply line 30 to meet a high power or operational fueling demand of the engine(s) 18.

During operation, the valve 64 receives the first fuel source 24 from the supply line 50 and the second fuel source 28 from the supply line 62 and is actuated to a position configured to direct the desired fuel source(s) to the engine(s) 18. For example, the valve 64 may be positioned to enable the second fuel source 28 to pass through the valve 64 when the fueling demand of the engine(s) 18 is associated with a high power demand. In another example, the valve 64 may be positioned to enable the first fuel source 24 to pass through the valve 64 when the engine(s) 18 is idling or in a low power state. Still further, in other instances, the valve 64 may be actuated to enable a mixture of the first fuel source 24 and the second fuel source 28 to pass through the valve 64. Once the desired fuel source(s) have been selected by the valve 64, the regulator 66 enables discharge from the accumulators 42 and 58 through the valve 64 in a controlled manner to provide the fuel source(s) to the engine(s) 18 via the supply line 68.

During operation of the coolant loop 70, the heated coolant 44 from the engine(s) 18 is directed through supply line 72 to the vaporizer 56 to vaporize the liquefied fuel 30 by transferring heat to the liquefied fuel 30, thus resulting in a reduction of temperature of the coolant 44. The cooled coolant 44 is then directed via supply line 74 and valves 46 and 48 to one or both of intercooler 38 and after cooler 40 to cool the gaseous fuel 32 either between compression stages or after compression is complete. For example, if intercooling is desired for a given implementation, the valve 46 is actuated to an open position to enable the coolant 44 to flow through the intercooler 38. Heat is transferred from the gaseous fuel 32 flowing through the intercooler to the coolant 44, thus raising the temperature of the coolant 44.

Similarly, if after cooling is desired for a given implementation, the valve 48 is actuated to an open position to enable the coolant 44 to flow through the after cooler 40 where heat is transferred from the compressed gaseous fuel 32 to the coolant 44. After flowing through one or both of the intercooler 38 and the after cooler 40, the coolant 44 is then recycled back to the engine(s) 18 via supply line 76.

Several advantages over the prior art may be associated with the disclosed fuel systems. For example, the first fuel subsystem 22 may enable use of the gaseous fuel 32 without directly connecting the gaseous fuel 32 to the engine(s) 18, thus enabling the gaseous fuel 32 to be utilized even in applications in which the tank 20 cannot sustain enough pressure for the gaseous fuel 32 to become useful for directly fueling the engine(s). Additionally, by providing the accumulator 42 for accumulating the compressed and cooled gaseous fuel 32 in the form of the first fuel source 24, the disclosed fuel system 10 may enable the gaseous fuel 32 to be captured and stored as the gaseous fuel 32 boils off from the liquefied fuel 30 but utilized to fuel the engine(s) 18 at a later period of time. The foregoing feature may reduce or eliminate the need to vent the gaseous fuel 32 to the surrounding environment.

Additionally, the first fuel subsystem 22 may be operated to provide the first fuel source 24 at a fuel flow rate matched to an idle or low power setting (e.g., dynamic braking) of the engine(s) 18 (e.g., approximately 1-20 kg/hr). This feature may enable use of the gaseous fuel 32 to meet engine demands that the second fuel subsystem 26 is not well suited to meet, for example, due to a low turn down ratio of the pump 54. Further, the system efficiency may be increased by utilizing the second fuel subsystem 26 to meet the full or high power engine fuel rate demands (e.g., approximately 600-700 kg/hr for an efficient operation) and utilizing the first fuel subsystem 22 to meet the low or idle fuel rate demands.

Additional efficiencies may be realized with embodiments of the fuel system 10 disclosed herein by operating the coolant loop 70, which utilizes the heated coolant 44 used to cool the engine(s) 18 to increase the efficiency of the fuel system 10. For example, use of the heated coolant 44 to first vaporize the liquefied fuel 30 in the vaporizer 56 (e.g., at about 12 KW) and then cool the gaseous fuel 32 in the intercooler 38 and/or the after cooler 40 (e.g., at about 4 KW), may result in further efficiencies.

It will be apparent to those skilled in the art that various modifications and variations can be made to the fuel systems. Other embodiments will be apparent to those skilled in the art from consideration of the specification and practice of the disclosed fuel systems. It is intended that the specification and examples be considered as exemplary only, with a true scope being indicated by the following claims and their equivalents.

What is claimed is:

1. A fuel system for an engine, comprising:
a tank holding a supply of liquefied fuel and a supply of gaseous fuel boiled off from the liquefied fuel;
at least one compressor fluidly coupled to the tank, the at least one compressor being configured to compress the supply of gaseous fuel;
a first accumulator fluidly coupled downstream of the at least one compressor, the first accumulator being configured to store the compressed supply of gaseous fuel
a pump configured to draw the liquefied fuel from the tank;
a vaporizer located downstream of the pump and configured to vaporize the liquefied fuel; and
a second accumulator located downstream of the vaporizer and configured to store the vaporized fuel.

2. The fuel system of claim 1, further including a regulator configured to supply the compressed supply of gaseous fuel to an engine at a fuel flow rate for a low power operation of the engine.

3. The fuel system of claim 2, wherein the fuel flow rate is between about 1 kg/hr and about 20 kg/hr.

4. The fuel system of claim 1, further including at least one of an intercooler and an after cooler, the at least one of an intercooler and an after cooler being configured to transfer heat from the compressed supply of gaseous fuel to a coolant.

5. The fuel system of claim 1, comprising a valve coupled to the first accumulator and the second accumulator and configured to selectively enable delivery of the compressed supply of gaseous fuel from the first accumulator, the vaporized fuel from the second accumulator, or a mixture thereof to an engine.

6. The fuel system of claim 5, wherein the valve is a mixing valve.

7. The fuel system of claim 1, wherein the vaporizer is configured to vaporize the liquefied fuel with a heated coolant from an engine to produce a cooled coolant.

8. The fuel system of claim 7, further including at least one of an intercooler and an after cooler, the at least one of an intercooler and an after cooler being configured to transfer heat from the compressed supply of gaseous fuel to the cooled coolant.

9. The fuel system of claim 1, further including:
a pump configured to draw the liquefied fuel from the tank; and
a vaporizer located downstream of the pump and configured to vaporize the liquefied fuel, wherein the vaporized fuel in configured to be stored in the first accumulator.

10. The fuel system of claim 1, wherein the at least one compressor is powered by electricity generated during dynamic braking of a locomotive.

11. The fuel system of claim 1, wherein the liquefied fuel comprises liquid natural gas (LNG), and the gaseous fuel comprises methane boiled off from the LNG.

* * * * *